US011775356B2

(12) United States Patent
Rojas Fonseca et al.

(10) Patent No.: US 11,775,356 B2
(45) Date of Patent: Oct. 3, 2023

(54) METHOD AND SYSTEM FOR FACILITATING BACKWARDS COMPATIBILITY OF A REST API ON AN EVOLVING DATA MODEL

(71) Applicant: Hewlett Packard Enterprise Development LP, Houston, TX (US)

(72) Inventors: Francisco José Rojas Fonseca, Alajuela (CR); David Corrales Lopez, Heredia (CR); Javier A. Albornoz, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 94 days.

(21) Appl. No.: 17/475,277

(22) Filed: Sep. 14, 2021

(65) Prior Publication Data

US 2023/0081395 A1    Mar. 16, 2023

(51) Int. Cl.
*G06F 9/54* (2006.01)
*G06F 16/21* (2019.01)
*G06F 8/61* (2018.01)
*G06F 16/2453* (2019.01)

(52) U.S. Cl.
CPC ............... *G06F 9/541* (2013.01); *G06F 8/63* (2013.01); *G06F 16/211* (2019.01); *G06F 16/24534* (2019.01)

(58) Field of Classification Search
CPC .......... G06F 9/541; G06F 8/63; G06F 16/211; G06F 16/24534
See application file for complete search history.

(56) References Cited

U.S. PATENT DOCUMENTS

| | | | | |
|---|---|---|---|---|
| 2002/0143764 | A1* | 10/2002 | Martin | G06F 16/252 |
| 2003/0154404 | A1* | 8/2003 | Beadles | H04L 63/20 |
| | | | | 726/1 |
| 2007/0250574 | A1* | 10/2007 | Tseitlin | G06F 8/71 |
| | | | | 709/205 |
| 2008/0034362 | A1* | 2/2008 | Hayama | G06F 9/541 |
| | | | | 717/174 |
| 2011/0185371 | A1* | 7/2011 | Brown | G05B 19/05 |
| | | | | 719/328 |
| 2012/0296929 | A1* | 11/2012 | Hossain | G06F 16/951 |
| | | | | 707/769 |

(Continued)

*Primary Examiner* — Tuan C Dao
(74) *Attorney, Agent, or Firm* — Park, Vaughan, Fleming & Dowler LLP

(57) ABSTRACT

During operation, the system receives a request, via a REST API, for data stored in a database which uses a schema associated with a current version, wherein the request indicates a version of the REST API. Responsive to determining that the indicated version is a prior version of the REST API which does not correspond to the current version of the database schema, the system: dispatches the request to a translation proxy; applies rules which converts the request to indicate an updated REST API version corresponding to the current version of the schema; obtains results from the database based on the converted request and the applied rules; and returns the results, wherein the prior version of the REST API comprises an old version and wherein the current version of the schema comprises a new version, which enables functionality from the new version to work with the old version.

20 Claims, 10 Drawing Sheets

(56) References Cited

U.S. PATENT DOCUMENTS

| | | | |
|---|---|---|---|
| 2013/0185624 A1* | 7/2013 | Appleyard | G06Q 10/10 |
| | | | 715/234 |
| 2014/0344340 A1* | 11/2014 | Tang | G06F 9/5011 |
| | | | 709/203 |
| 2015/0089354 A1* | 3/2015 | Abrahami | G06F 16/958 |
| | | | 715/235 |
| 2015/0100550 A1* | 4/2015 | Desai | G06F 16/1873 |
| | | | 707/638 |
| 2017/0070361 A1* | 3/2017 | Sundermeyer | H04L 67/025 |
| 2017/0187607 A1* | 6/2017 | Shaikh | H04L 41/342 |
| 2018/0039494 A1* | 2/2018 | Lander | H04L 45/02 |
| 2018/0129695 A1* | 5/2018 | Standefer, III | G06F 16/288 |
| 2019/0114165 A1* | 4/2019 | Ghiondea | G06F 8/71 |
| 2019/0327144 A1* | 10/2019 | Tembey | G06F 9/45558 |
| 2022/0116480 A1* | 4/2022 | Crisan | H04L 67/01 |

\* cited by examiner

METHOD AND SYSTEM FOR FACILITATING BACKWARDS COMPATIBILITY OF A REST API ON AN EVOLVING DATA MODEL

BACKGROUND

This disclosure is generally related to the field of data management. More specifically, this disclosure is related to a method and system for facilitating backwards compatibility of a representational state transfer (REST) application programming interface (API) on top of an evolving data model.

BRIEF DESCRIPTION OF THE FIGURES

In the figures, like reference numerals refer to the same figure elements.

DETAILED DESCRIPTION

Figure 1:
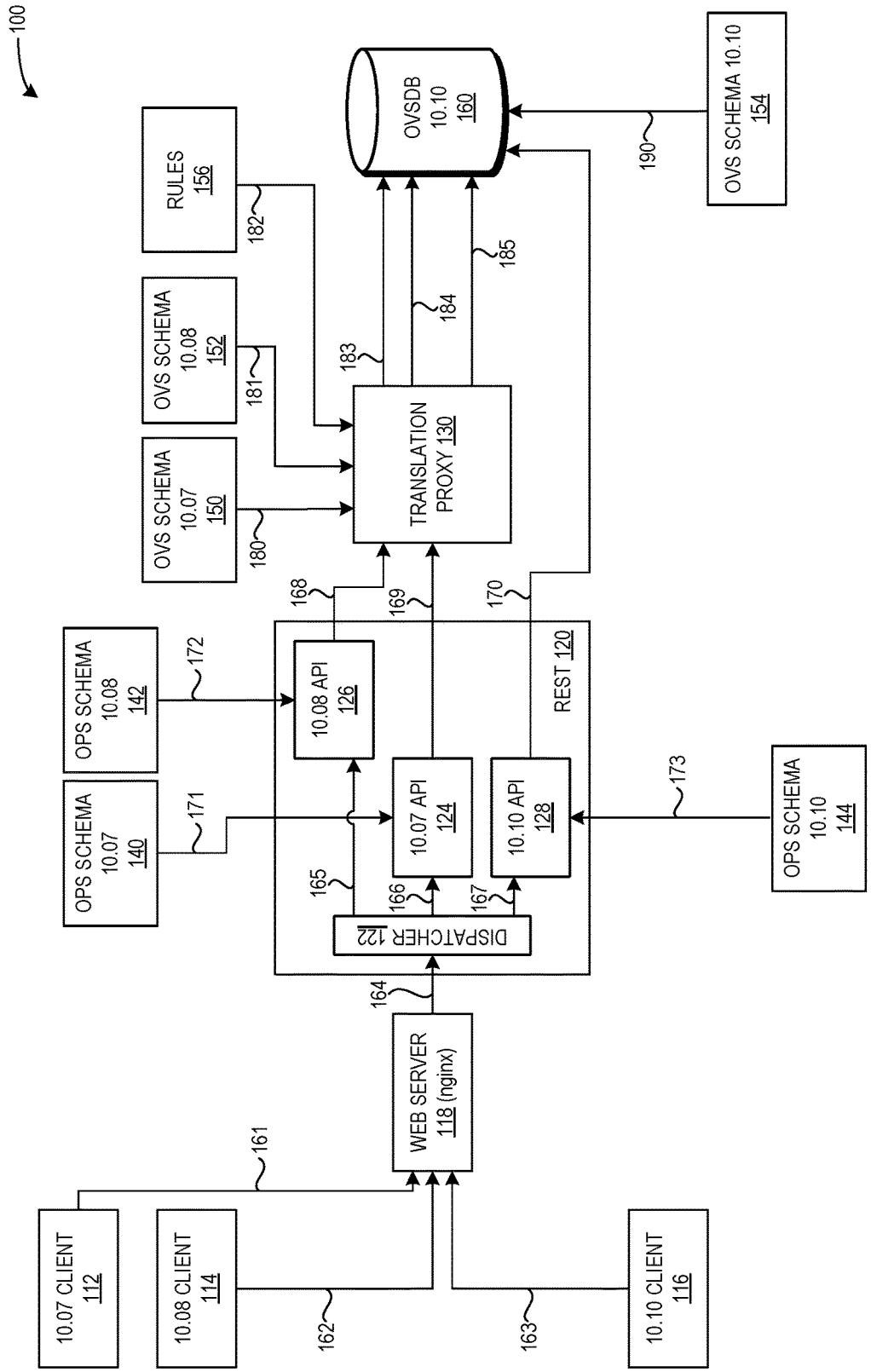
FIG. 1 illustrates a diagram with entities and communications which facilitate backwards compatibility of a REST API on an evolving data model, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A client may use a representational state transfer (REST) application programming interface (API) (of a certain version) to obtain or set data from/to a database (with a certain schema or model version). If an update is made to the database schema model, client calls made using a prior version of the REST API may fail. For example, an external client may use a REST API version 10.04 to successfully manage information stored in an Open vSwitch Database (OVSDB), which is running or uses a schema associated with version 10.04. As the database schema or model changes, the version of the schema or model changes, and so does the underlying data. An update may be made to the OVSDB, with a schema for version 10.05. The correspondingly updated REST API version 10.05 can be automatically generated from the underlying OVSDB schema data model. However, the external client may still be using a script or other automated tools based on the prior REST API version 10.04. As a result, the external client may experience failed transactions and may no longer be able to successfully manage information stored in the OVSDB.

Several approaches may be used to address this problem. In a first approach, the decision may be made to refrain from updating the REST model based on newer releases. However, this would imply refraining from changing the underlying model, which would result in no new features, no bug fixes, etc. Such a fixed and static model may not be a feasible solution for most systems. In a second approach, the system can completely decouple the REST API from the OVSDB schema model. However, this solution can result in the significant burden of manually maintaining and updating the REST API. Furthermore, in cases where the underlying model has irreparably changed (e.g., deletion of an entire table), even manual updating may not suffice. In a third approach, the system can maintain an internal OVSDB instance for each and every REST API version. However, this may result in data duplication and a significant cost in memory consumption because supporting all previous REST API versions would require both maintaining the entire database for an older schema model and synchronizing multiple OVSDB servers instances between the previous REST API versions.

The described aspects address the challenges of the above-described approaches by providing a system which adds a proxy between the REST APIs and the OVSDB server. The proxy can allow multiple REST APIs to co-exist (and be used by external clients), while the system maintains and updates a single OVSDB schema model. The proxy can intercept OVSDB transactions and can translate between an older model (e.g., a prior version of the REST API) and a new OVSDB schema model (e.g., a current version of the database schema). The system described herein can also provide translation between newer clients and older servers. Thus, the described system can facilitate backwards compatibility of a REST API on an evolving data model.

Detailed Description of Entities and Communications which Facilitate Backwards Compatibility FIG. 1 illustrates a diagram 100 with entities and communications which facilitate backwards compatibility of a REST API on an evolving data model, in accordance with an aspect of the present application. In diagram 100, multiple clients can transmit Hypertext Transfer Protocol (HTTP) requests, e.g., by using Uniform Resource Identifiers (URIs) with different REST API versions to indicate which REST API version they wish to use. A web server can receive and dispatch these HTTP requests to the appropriate REST API module, which in turn can send the request either directly to the OVSDB server (in the case where the REST API version matches the current database schema version) or to a translation proxy (in the case where the REST API version does not match or is prior version of the current database schema version). The system can load the various OVSDB schema definitions (e.g., the Open Switch or OPS schemas) into the appropriate REST API module. In addition, the system can prune the OPS schemas to obtain Open vSwitch (OVS) schemas. The system can load the prior OVS schemas and a set of rules into the translation proxy, and can further load the current OVS schema into the database server itself.

For example, in diagram 100, the system can load an OVS schema 10.10 154 (a current version) into an OVSDB 10.10 server 160 (via a communication 190) and initialize the data model with the loaded OVS schema 10.10 154. The system can load an OPS schema 10.07 140 and an OPS schema 10.08 142 into, respectively, a REST 10.07 API module 124 and a REST 10.08 API module 126 (via, respectively, communications 171 and 172). The system can also load an OPS schema 10.10 144 (the current version) into a REST 10.10 API module 128 (via a communication 173). The system can initialize the REST APIs for each loaded schema, and connect to a translation proxy 130 and OVSDB 10.10 server 160.

Furthermore, the system can also load an OVS schema 10.07 150 and an OVS schema 10.08 152 (prior versions) into translation proxy 130 (via communications 180 and 181, respectively), and can cache the loaded schemas. The system can also load rules 156 into translation proxy 130 (via a communication 182). Rules 156 can include rules and logic for how to convert or transform (e.g., rename, move, delete, etc.) tables and columns from different OVSDB schema versions). Translation proxy 130 may be referred to as a schema migration framework (SMF) translation proxy, an SMF proxy, or an SMF daemon ("smfd"), and rules 156 may be referred to as SMF rules.

A REST API 10.07 client 112 can send a URI indicating a prior version 10.07 (via a communication 161), and a REST API 10.08 client 114 can send a URI indicating a prior version 10.08 (via a communication 162). Another REST API 10.10 client 116 can send a URI indicating a current version 10.10 (via a communication 163). These URIs and requests can be received by a web server 118 (e.g., nginx), which can send the request on to a dispatcher or dispatch component 122 of a REST module 120 (via a communication 164). Dispatcher 122 can dispatch each request to the appropriate REST API module, based on the versions used or indicated in the received URIs or requests. For example: dispatcher 122 can send the request from REST API 10.07 client 112 to a REST 10.07 API module 124 (via a communication 166); dispatcher 122 can send the request from REST API 10.08 client 114 to a REST 10.08 API module 126 (via a communication 165); and dispatcher 122 can send the request from REST API 10.10 client 116 to a REST 10.10 API module 128 (via a communication 167).

In the latest or most recent version of the REST API module (e.g., REST 10.10 API module 128), the system can determine that the REST API version matches the current database schema, and send the request directly to OVSDB 10.10 server 160 (via a communication 170) to obtain the requested results.

In the prior versions of the REST API modules (e.g., REST 10.07 API module 124 and REST 10.08 API module 126), the system can determine that the REST API version does not match (i.e., "nonmatching") or is a prior version of the current database schema, and send the request to translation proxy 130 (via, respectively, communications 168 and 169). Note that each REST API module may have multiple separate channels to translation proxy 130. That is, each of communications 168, 169, and 170 may include multiple channels. One channel can be for monitors, e.g., a process to be subscribed to the database and automatically receive information if certain changes to the database occur (similar to a communication 594 described below in relation to FIG. 5). Another channel can be for polling the database, e.g., querying the database for information regarding a certain table/column/row.

Translation proxy 130 can perform on-the-fly OVSDB protocol translations for multiple OVSDB schemas versions against the current version. Translation proxy 130 can perform these translations by applying one or more of rules 156 (which were previously loaded into translation proxy 130 via communication 182), to obtain converted requests. These translations (of requests from clients to the database server) may be referred to as "north-to-south translations." Translation proxy 130 can send these converted requests to OVSDB 10.10 server 160 (via, respectively, communications 183 and 184) to obtain the requested results. Translation proxy 130 can apply reverse translations as needed, to obtain results in a format to return to the requesting clients. These reverse translations (of data from the database server to be returned to the clients) may be referred to as "south-to-north translations." The system can send the obtained results (either the requested results obtained directly from OVSDB 10.10 160 (via a communication 170) or the reverse translated results obtained by translation proxy 130 (via the north-to-south translations, communications 183 and 184, and the south-to-north translations) to web server 118, which can send the results back to the appropriate requesting client (e.g., 112, 114, or 116). In addition, translation proxy 130 can obtain or retrieve data from OVSDB 10.10 server 160, including information needed by translation proxy 130 to translate or convert a request (via a communication 185). This communication may be referred to as a "sideband cache" and is described below in relation to communication 580 of FIG. 5).

Sample Schema Change in the Prior Art: Failed Client Call

Figure 2:
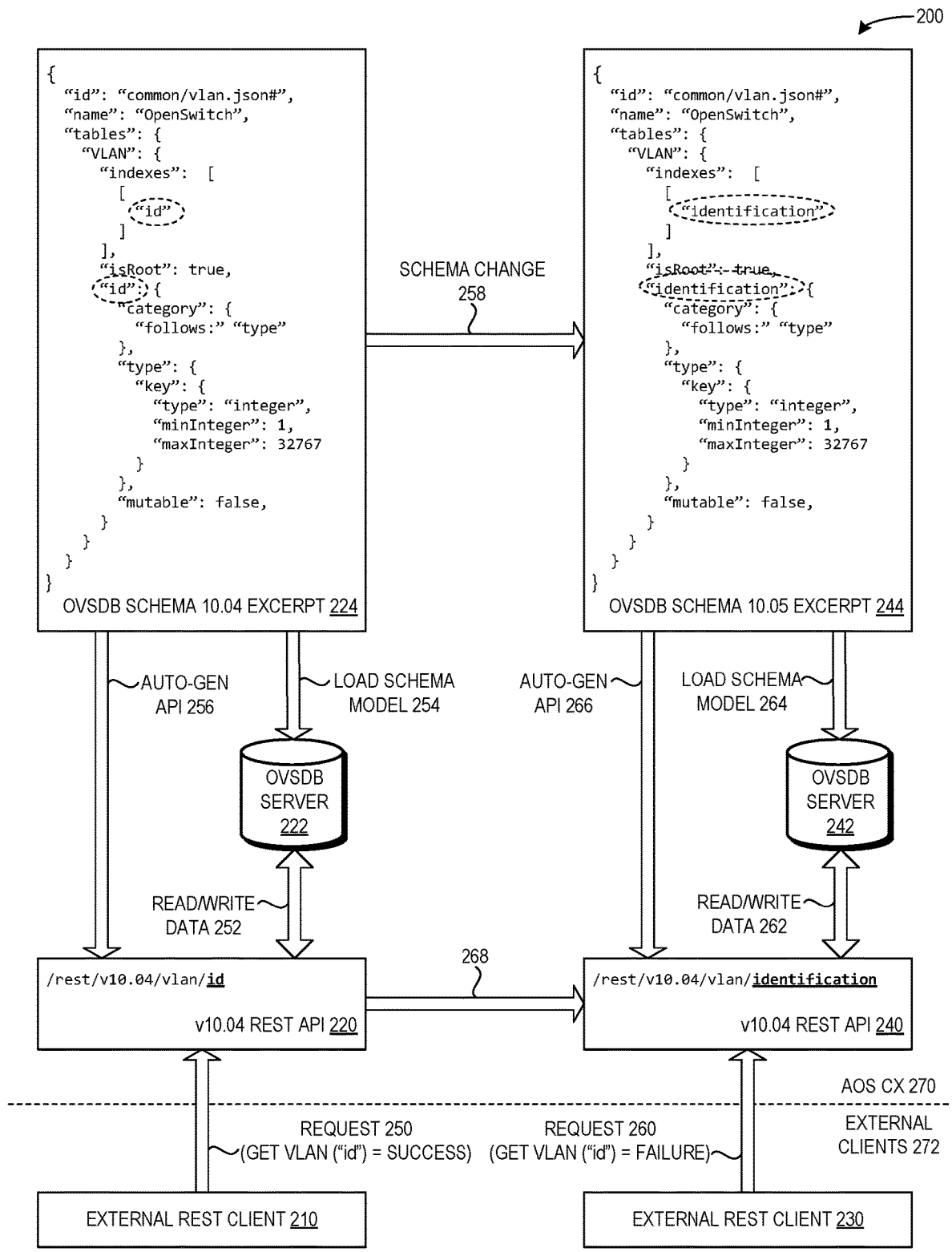
FIG. 2 illustrates a diagram with a sample schema change, including a failed client call from a prior REST API version, in accordance with an aspect of the prior art.

FIG. 2 illustrates a diagram 200 with a sample schema change, including a failed client call from a prior REST API version, in accordance with an aspect of the prior art. Diagram 200 can include entities which are associated with or act as a part of an operating system (such as an AOS CX 270) as well as entities which are associated with or act as part of external clients 272. Diagram 200 can also include an OVSDB schema 10.04 excerpt 224, in which a VLAN field is named and defined as "id" (as indicated with the dashed oval around the two instances of the word "id" in excerpt 224). During operation, the system can load an auto-generated API 256 into REST API module 220 (similar to the OPS schemas loaded into the REST API modules of FIG. 1 via communications 171-173). The system can also load a schema model 254 (for v10.04) into OVSDB server 222 (similar to the OVS schema loaded into the OVSDB server in FIG. 1 via communication 190).

An external REST client 210 can send a request 250 such as "GET VLAN ("id")," which is received by a v10.04 REST API module 220 and expected as indicated by a URI of "/rest/v10.04/vlan/id." Because the REST API version indicated in the request or URI (v10.04) matches the current version of the schema loaded into OVSDB server 222 (v10.04), the system can obtain the requested data directly and successfully from OVSDB server 222 (via a read/write data operation 252), which can result in a "success" for request 250 of "GET VLAN ("id")."

At a subsequent time, a schema change 258 may occur (e.g., when a client upgrades the firmware). Schema change 258 may include changing the name of "id" to "identification" (as indicated with the dashed oval around the two instances of the word "identification" in OVSDB schema 10.05 excerpt 244). The system can load an auto-generated API 266 into REST API module 240 (similar to the OPS schemas loaded into the REST API modules of FIG. 1 via communications 171-173). The system can also load an updated schema model 264 (for v10.05) into OVSDB server 242 (similar to the OVS schema loaded into the OVSDB server in FIG. 1 via communication 190).

An external REST client 230 can send a request 260 such as "GET VLAN ("id")," which is received by a v10.04 REST API module 240 and expected as indicated by a URI of "/rest/v10.04/vlan/identification." However, because the request uses "id" but the underlying schema has changed to expect "identification" (e.g., the REST API version indicated in the request or URI (v10.04) does not match the current version of the OVSDB schema loaded into OVSDB server 242 (v10.05)), a read/write data 262 operation will fail, resulting in a "failure" for request 260 of "GET VLAN ("id")." Thus, a change 268 indicates that the REST API version remains the same even when the URI is broken (e.g., the request does not return the requested data and is a failure).

Various possible OVSDB schema changes can result in the failure indicated by, e.g., request 260. Some of these schema changes include: adding a new table with a column containing a 1-to-m reference to pre-existing tables; removing or renaming a table; adding new columns or map keys containing at least one of a 1-to-m reference to pre-existing tables, an m-to-1 reference to any table, and a new column which is part of a table index (e.g., changing a hierarchy of information stored in a table or data structure); removing or renaming a column or a map key; changing a type for a column or map key; modifying an index of a table; modifying an enumeration; and changing a category for a column; and any type of change which makes a first schema version (such as a new or current schema version) incompatible with a second schema version (such as an old schema version).

Based on these many potential schema changes, the number of potential failures may be significant and would require a non-trivial effort to monitor while also allowing an organization to efficiently add new features and add fixes to existing features.

Sample Schema Change Using Translation Proxy: Successful Client Call

Figure 3:
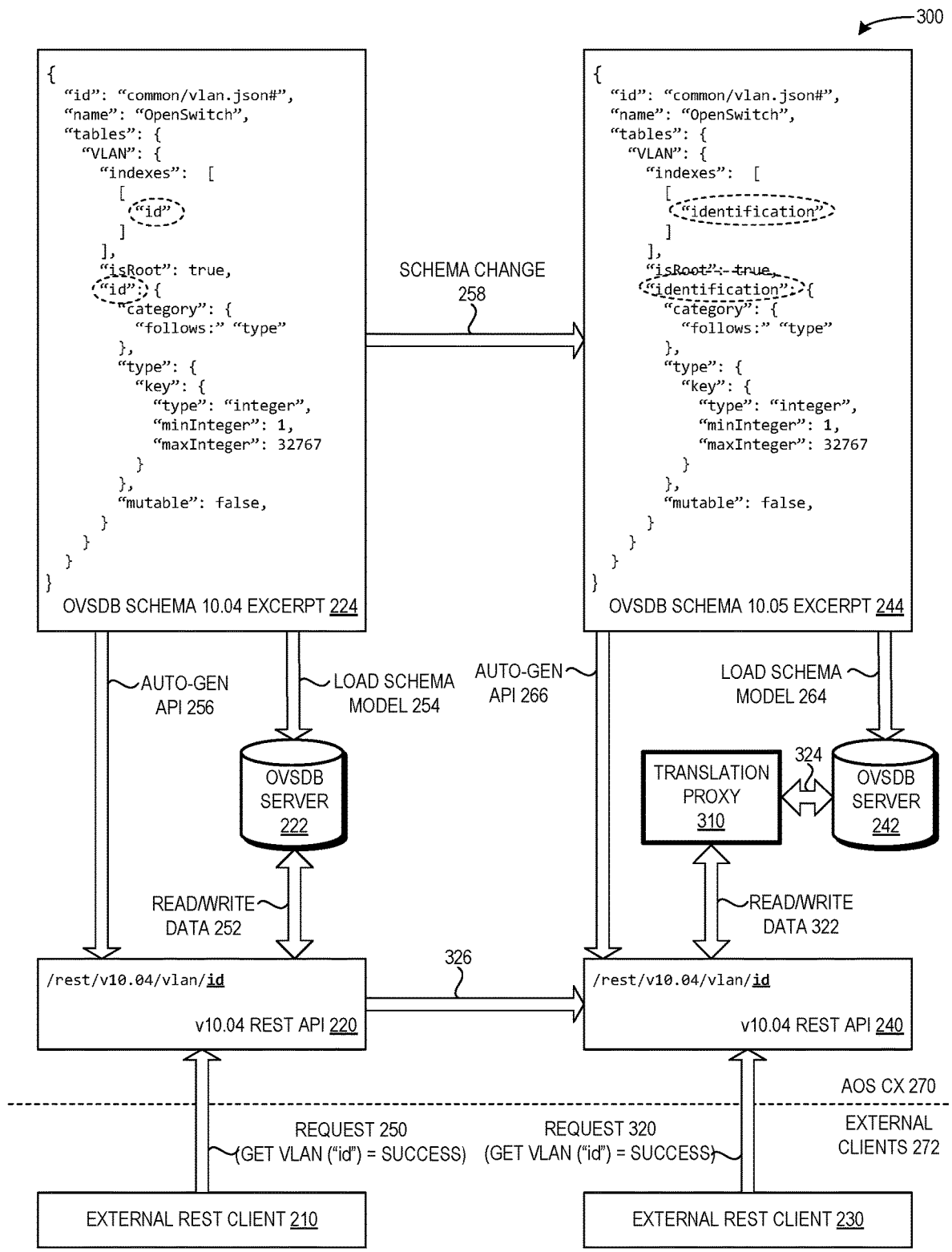
FIG. 3 illustrates a diagram with the sample schema change as in FIG. 2, including the use of a translation proxy and a successful client call from a prior REST API version, in accordance with an aspect of the present application.

FIG. 3 illustrates a diagram 300 with the sample schema change as in FIG. 2, including the use of a translation proxy and a successful client call from a prior REST API version, in accordance with an aspect of the present application. Diagram 300 includes the addition of a translation proxy 310, which communicates with v10.04 REST API module 240 via a read/write data 322 communication, and further communicates with OVSDB server 242 via a communication 324. During operation, after schema change 258, external REST client 230 can send a request 320 such as "GET VLAN ("id")" which is received by v10.04 REST API 240. Because the REST API version indicated in the request or URI (v10.04) does not match the current version of the schema loaded into OVSDB server 242 (v10.05), the system can send request 320 to translation proxy 310, which can apply rules to convert the request to indicate the updated REST API version which corresponds to the current schema version. Translation proxy can send the converted request to OVSDB server 242 (via communication 324) to obtain the requested results, and can further apply reverse translations to obtain results in a format to return to external REST client 230. The system can send the results obtained by translation proxy 310 to v10.04 REST API 240 (via communication 322) and back to external REST client 230. Thus, the result is a "success" for request 320 of "GET VLAN ("id")." An arrow 326 indicates that the REST API version remains the same as do the URIs (e.g., the request returns the requested data and is a success).

Figure 4:
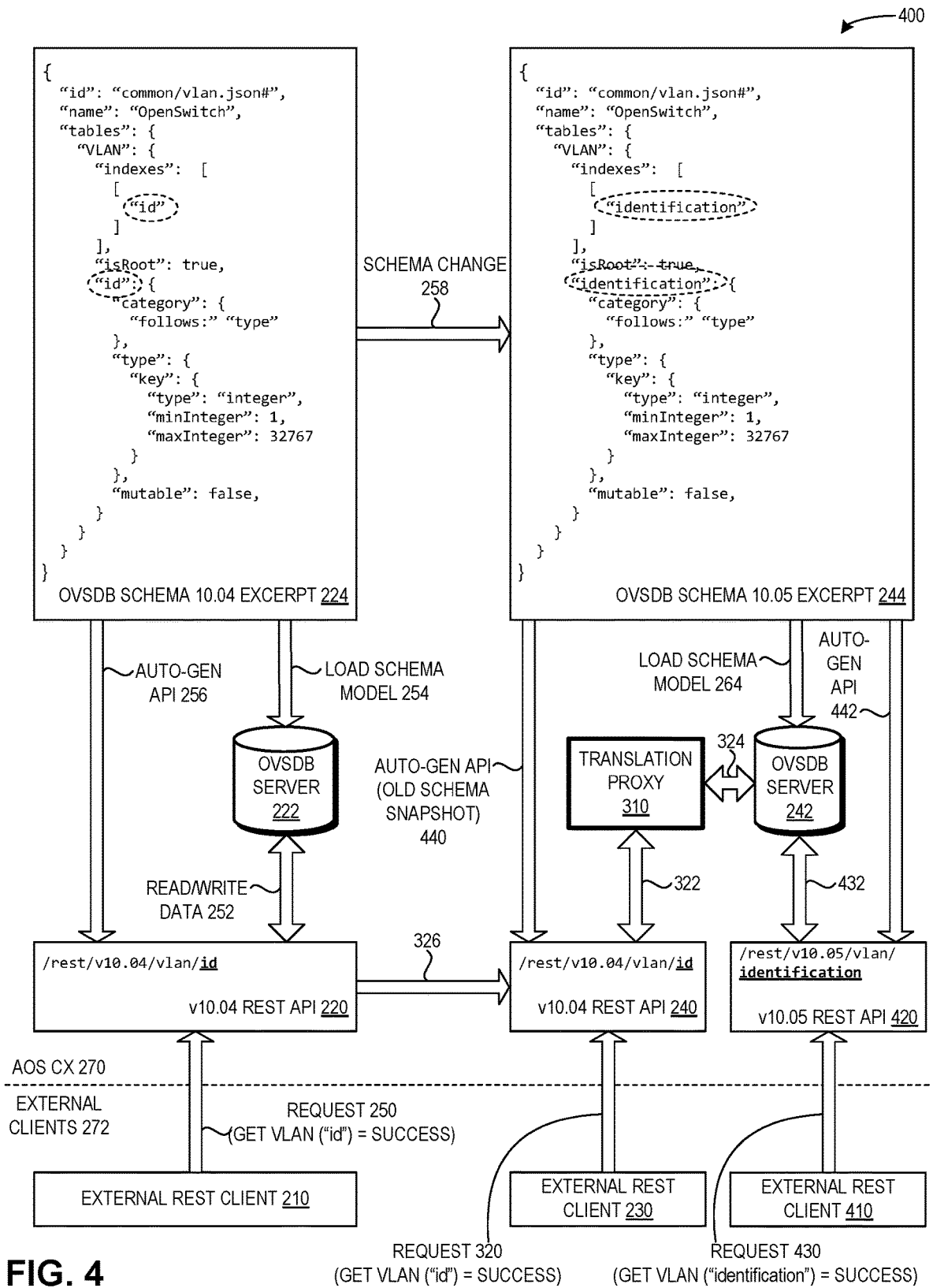
FIG. 4 illustrates a diagram with the sample schema change as in FIG. 2, including the use of a translation proxy and successful client calls from prior and current REST API versions, in accordance with an aspect of the present application.

FIG. 4 illustrates a diagram 400 with the sample schema change as in FIG. 2, including the use of a translation proxy and successful client calls from a prior and current REST API versions, in accordance with an aspect of the present application. During operation, the system can load an auto-generated API 442 into a v10.05 REST API module 420 (similar to the OPS schemas loaded into the REST API modules of FIG. 1 via communications 171-173). In addition to external REST client 230 sending request 320 using the prior version v10.04 REST API and "id," diagram 400 depicts that an external REST client 410 can send request 430 such as "GET VLAN ("identification")," which is received by a v10.05 REST API 420 and expected as indicated by a URI of "/rest/v10.04/vlan/identification." Because the REST API version indicated in the request or URI (v10.05) matches the current version of the schema loaded into OVSDB server 242 (v10.05), the system can obtain the requested data directly and successfully from OVSDB server 242 (via a read/write data operation 432), which can result in a "success" for request 430 of "GET VLAN ("identification")." Thus, diagram 400 illustrates how the described aspects can support multiple REST API versions concurrently on top of the same OVSDB schema.

Detailed View of Translation Proxy

Figure 5:
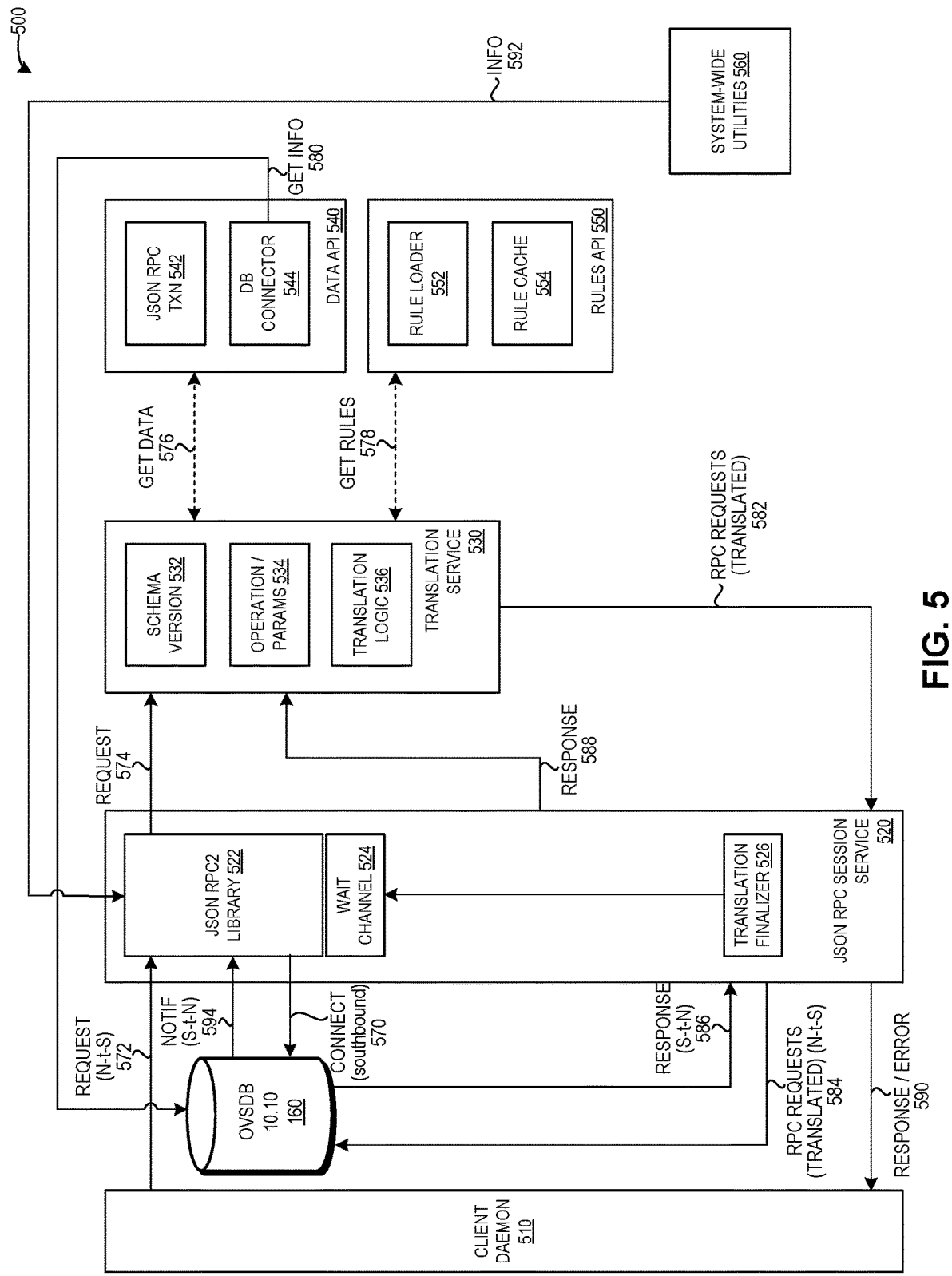
FIG. 5 illustrates a diagram which depicts a detailed view of a translation proxy, in accordance with an aspect of the present application.

FIG. 5 illustrates a diagram 500 which depicts a detailed view of a translation proxy, in accordance with an aspect of the present application. Diagram 500 depicts communications and stages/services between a client daemon 510, an OVSDB 10.10 server 160, a JavaScript Object Notation (JSON) remote procedure call (RPC) session service 520, a translation service or component 530, a data API 540, a rules API 550, and a system-wide utilities module 560. The stages/services depicted in diagram 500 can operate concurrently to service multiple concurrent OVSDB JSON RPC requests. The translation proxy or daemon can perform initialization procedures for booting up, including connecting to OVSDB server 160 in a southbound direction (via a connect (southbound) 570 communication) and opening a socket (in a northbound direction) waiting for OVSDB clients.

An external REST client (510) can establish a session which is accepted as a northbound connection by the translation proxy, and can also send a JSON RPC request (north-to-south) 572 to JSON RPC session service 520. JSON RPC session service 520 can include a JSON RPC2 library 522, a wait channel 524, and a translation finalizer 526. JSON RPC2 library 522 can include functionality to accept connections, manage sessions, and handle RPC callbacks and calls.

JSON RPC session service 520 can send a JSON RPC request 574 to translation service 530. The north-to-south translation can begin. Translation service 530 can include a schema version module 532, an operations/parameters module 534, and a translation logic module 534. Translation service 530 can selectively unmarshall the JSON RPC request, which can be supported by schema version 532 and clients. Translation service 530, via its components, can also parse the JSON RPC request, e.g., to extract a method. Translation service 530 can obtain data (via a get data 576 communication) from data API 540 to match the requests by table(s) or column(s). Data API 540 can include a JSON RPC transaction module 542 and a database (DB) connector 544 (e.g., an interface description language (IDL)). JSON RPC transaction module 542 can include data contained in the JSON RPC request, and DB connector 544 can include data used for translations (which data can be retrieved as needed from OVSDB server 160 (via a get information 580 communication)). Translation service 530 can also obtain rules (via a communication get rules 578) from rules API 550. Rules API 550 can include a rule loader component 552 and a rule cache 554.

Translation service 530, via its components, can translate the JSON RPC request using information from the request itself (e.g., associated with JSON RPC transaction module 542) or information from the local OVSDB server 160 (e.g., as obtained by DB connector 544 via communication 580). Translation service 530 can send the translated request to JSON RPC session service 520 (via an RPC requests (translated) 582 communication). JSON RPC session service 520 can send the translated request to OVSDB server 160 (via an RPC requests (translated) 584 communication, which is indicated as a north-to-south communication). OVSDB server 160 can respond to the JSON RPC request and return a response 586 (which is indicated as a south-to-north communication).

At this point, the south-to-north translation can begin, which translation is a similar process as described above in relation to communications 576 (and associated operations relating to data API 540), 578 (and associated operations relating to rules API 550), 580, and 582, but in a reverse direction. The result of the south-to-north translation can be sent as a final result back to the REST client (510) (via a communication response/error 590).

System-wide utilities 560 can include, e.g., modules which perform functions relating to registering errors, correlating information, controlling operating systems, and logging diagnostics. System-wide utilities 560 can send information 592 to OVSDB server 160, which information can be used for maintenance, logging, error-reporting, or other purposes. For example, if OVSDB server 160 receives translated request 584 and cannot return data successfully in response 586, OVSDB can send an error message back in response 586. The error message may include information obtained from information 592 (which was obtained by system-wide utilities 560). This is depicted as final communication response/error 590 back to the REST client (510).

In addition, OVSDB server 160 can provide an asynchronous functionality, supported by the translation proxy, in which a REST client (such as 510) may subscribe to and/or monitor particular tables and/or columns of data stored in OVSDB server 160. OVSDB server 160 can send a change notification 594 (which is indicated as a JSON RPC request in a south-to-north direction). Change notification 594 does not have the same roundtrip nature of a normal JSON RPC request (described above in relation to communications 572-590), as it requires only a south-to-north translation.

While the described aspects of the instant application depict a REST client with a prior version communicating with an OVSDB server with a current version, the translation proxy described herein may be used in any situation in which an OVSDB client and an OVSDB server are expecting and/or using different OVSDB schema models (e.g., when the version in the request does not match or is a nonmatching version of the current version of the schema model).

Figure 6:
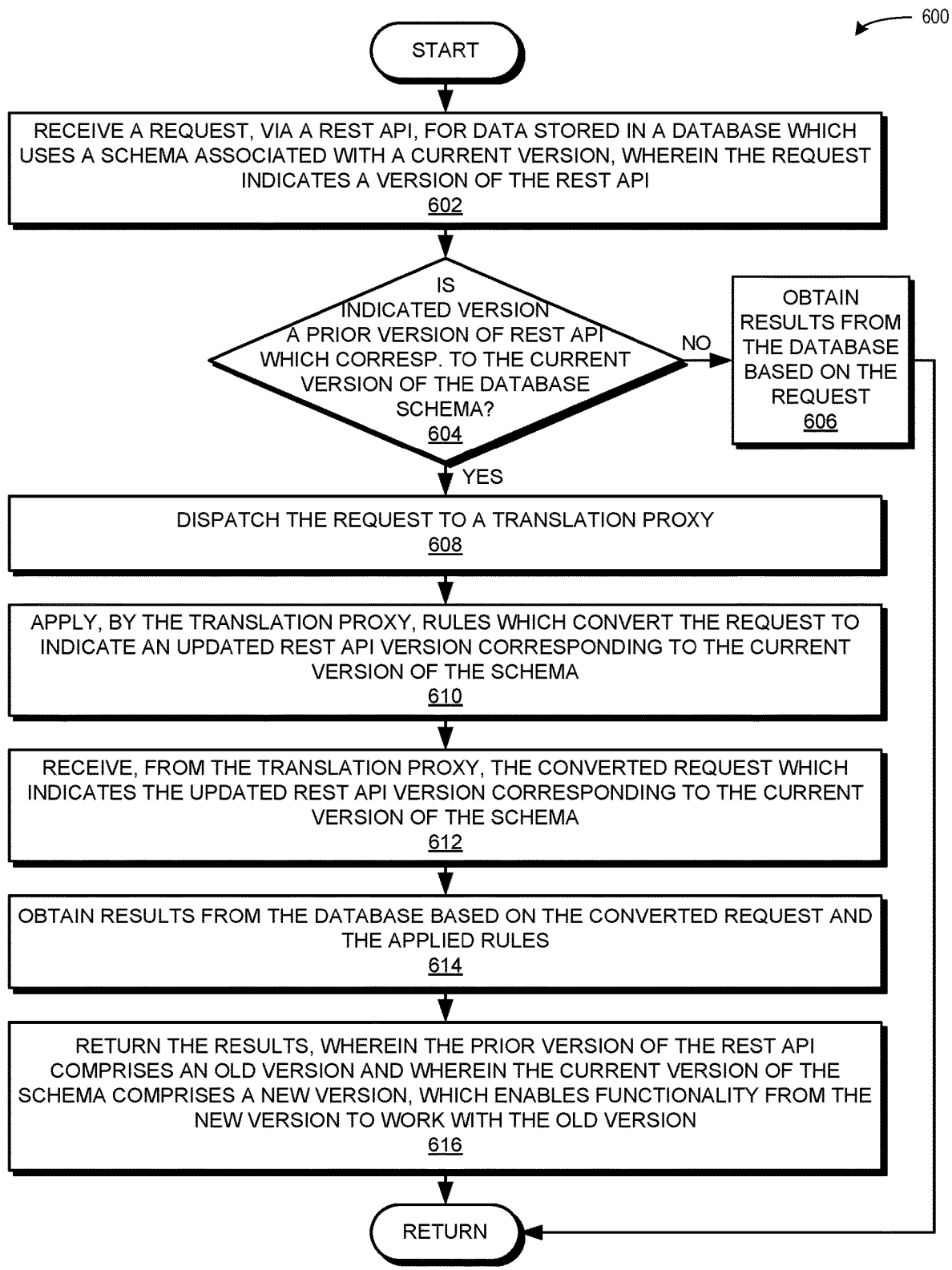
FIG. 6 presents a flowchart illustrating a method which facilitates backwards compatibility of a REST API on an evolving data model, in accordance with an aspect of the present application.

Method which Facilitates Backwards Compatibility of REST API on an Evolving Data Model FIG. 6 presents a flowchart 600 illustrating a method which facilitates backwards compatibility of a REST API on an evolving data model, in accordance with an aspect of the present application. During operation, the system receives a request, via a REST API, for data stored in a database which uses a schema associated with a current version, wherein the request indicates a version of the REST API (operation 602). If the indicated version is not a prior version of the REST API which does not correspond to the current version of the schema used by the database (decision 604) (i.e., the indicated REST API version and the database schema version match), the system obtains the results directly from the database based on the request (operation 606), and the operation returns.

If the indicated version is a prior version of the REST API which does not correspond to the current version of the schema used by the database (decision 604) (i.e., the versions do not match or are nonmatching versions), the system dispatches the request to a translation proxy (operation 608). The system applies, by the translation proxy, rules which convert the request to indicate an updated REST API version corresponding to the current version of the schema (operation 610). The system receives, from the translation proxy, the converted request which indicates the updated REST API version corresponding to the current version of the schema (operation 612). The system obtains results from the database based on the converted request and the applied rules (operation 614). The system can perform, by the translation proxy based on the rules, a reverse translation on the obtained results to a format associated with the request, and can return the reverse translated results as the results (not shown). The system returns the results (or the reverse translated results, as described above in relation to FIG. 1), wherein the prior version of the REST API comprises an old version and wherein the current version of the schema comprises a new version, which enables functionality from the new version to work with the old version (operation 616). The operation returns. While flowchart 600 and prior diagrams refer to a database which uses a current (or latest) schema version and a REST API request which indicates an old schema version, the described aspects may also apply to any two different schema versions between the database and the REST API request (e.g., the database schema version may be an older version which is not the current version, and the REST API request may indicate any version which is not the same as the database schema version).

Methods which Facilitate Initialization and Build Processes

Figure 7A:
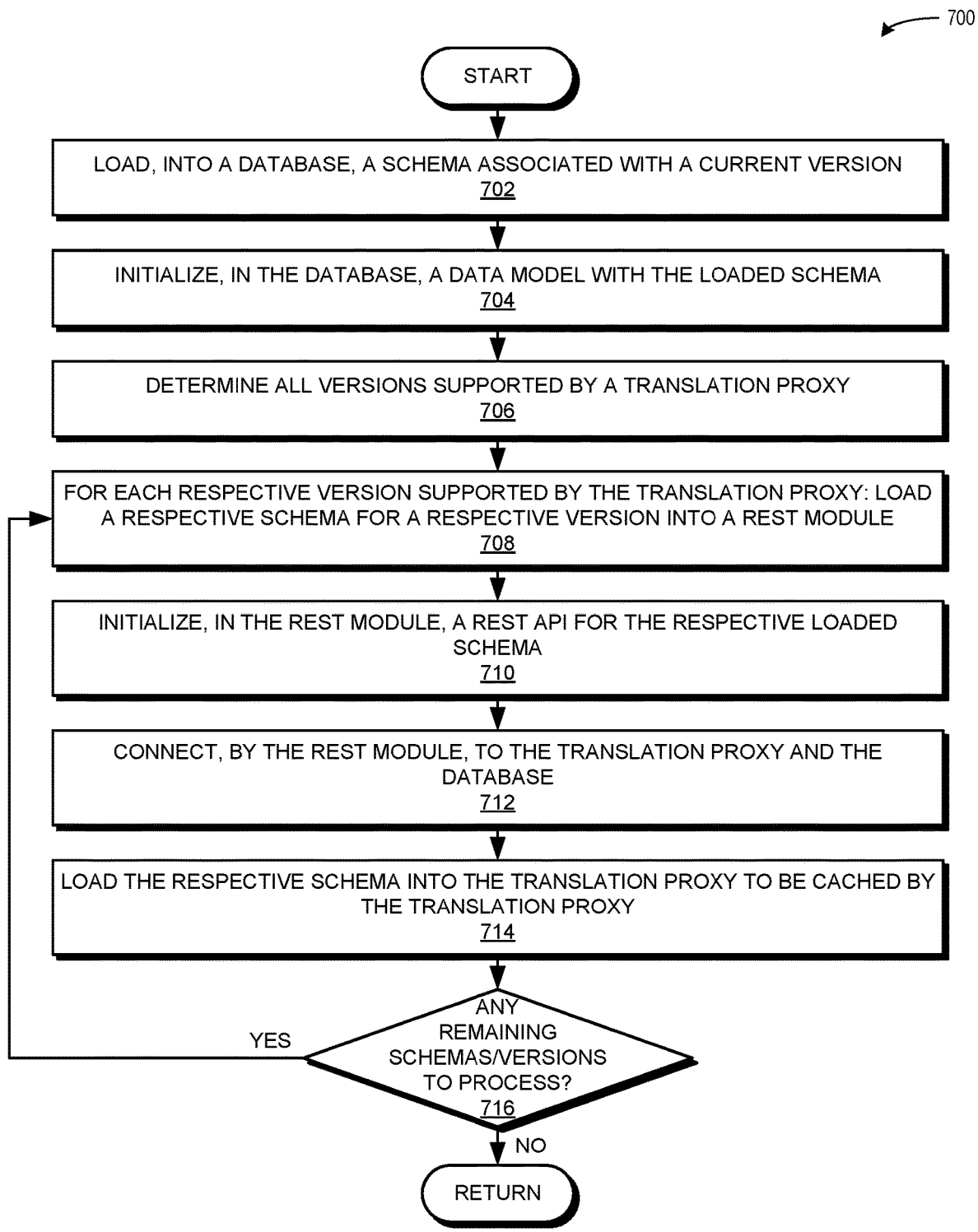
FIG. 7A presents a flowchart illustrating a method which facilitates an initialization process, in accordance with an aspect of the present application.

FIG. 7A presents a flowchart 700 illustrating a method which facilitates an initialization process, in accordance with an aspect of the present application. During operation, the system loads, into the database, the schema associated with the current version (operation 702). The system initializes, in the database, a data model with the loaded schema (operation 704). The system determines all versions supported by the translation proxy (operation 706). For each respective version supported by the translation proxy, the system loads a respective schema for a respective version into a REST module (operation 708). The system initializes, in the REST module, a REST API for the respective loaded schema (operation 710). The system connects, by the REST module, to the translation proxy and the database (operation 712), and loads the respective schema into the translation proxy to be cached by the translation proxy (operation 714). If there are any remaining schemas and/or versions to process (decision 716), the operation continues at operation 708. If there are no remaining schemas and/or versions to process (decision 716), the operation returns.

Figure 7B:
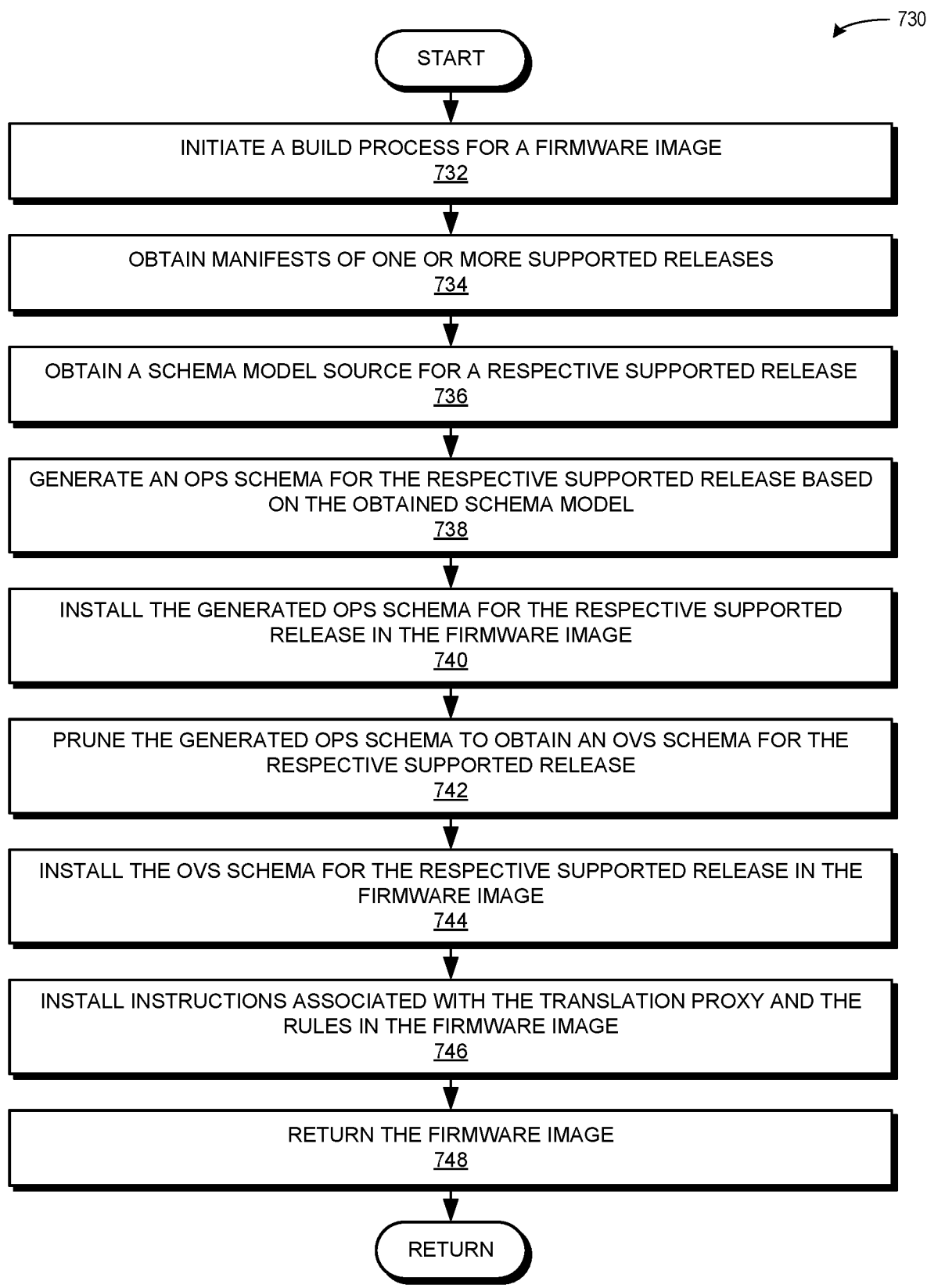
FIG. 7B presents a flowchart illustrating a method which facilitates a build process, in accordance with an aspect of the present application.

FIG. 7B presents a flowchart illustrating a method which facilitates a build process, in accordance with an aspect of the present application. During operation, the system (via, e.g., a build agent), initiates a build process for a firmware image (operation 732). The system obtains manifests of one or more supported releases (operation 734). The system obtains a schema model source for a respective supported release (operation 736) and generates an OPS schema for the respective supported release based on the obtained schema model (operation 738). The system installs the generated OPS schema for the respective supported release in the firmware image (operation 740). The system prunes the generated OPS schema to obtain an OVS schema for the respective supported release (operation 742), and installs the OVS schema for the respective supported release in the firmware image (operation 744). The system installs instructions associated with the translation proxy and the rules in the firmware image (operation 746), and returns the firmware image (operation 748).

Computer System and Apparatus

Figure 8:
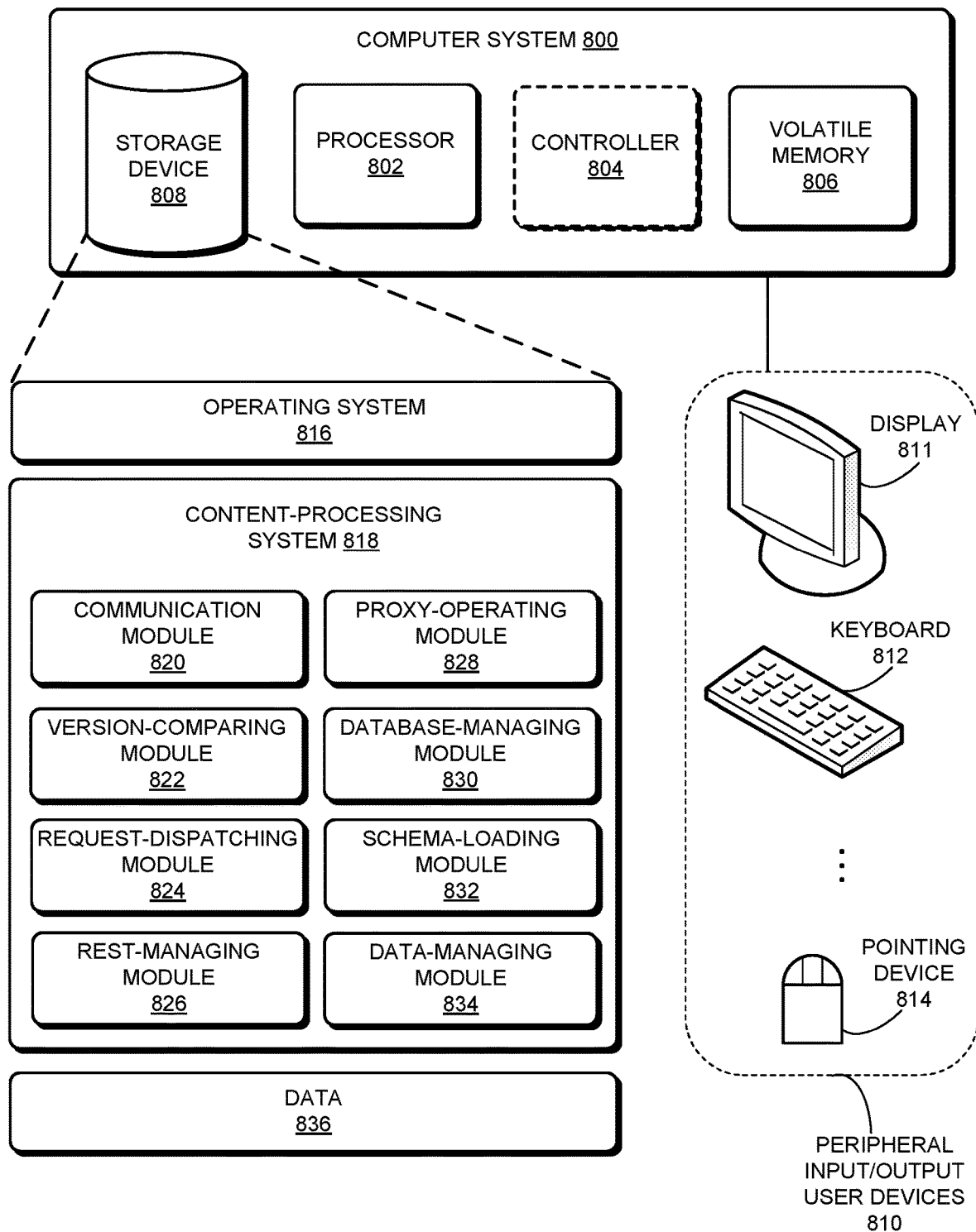
FIG. 8 illustrates a computer system which facilitates backwards compatibility of a REST API on an evolving data model, in accordance with an aspect of the present application.

FIG. 8 illustrates a computer system 800 which facilitates backwards compatibility of a REST API on an evolving data model, in accordance with an aspect of the present application. Computer system 800 includes a processor 802, a volatile memory 806, and a storage device 808. In some aspects, computer system 800 can include a controller 804 (indicated by the dashed lines). Volatile memory 806 can include, e.g., random access memory (RAM), that serves as a managed memory, and can be used to store one or more memory pools. Storage device 808 can include persistent storage which can be managed or accessed via processor 802 (or controller 804). Furthermore, computer system 500 can be coupled to peripheral input/output (I/O) user devices 810, e.g., a display device 811, a keyboard 812, and a pointing device 814. Storage device 808 can store an operating system 816, a content-processing system 818, and data 836.

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets or requests which indicate a REST API version (communication module 820).

Content-processing system 818 can further include instructions for receiving a request, via a REST API, for data stored in a database which uses a schema associated with a current version, wherein the request indicates a version of the REST API (communication module 820). Content-processing system 818 can include instructions for, responsive to determining that the indicated version is a prior version of the REST API which does not correspond to the current version of the schema used by the database (version-comparing module 822), performing the following operations. Content-processing system 818 can include instructions for dispatching the request to a translation proxy (request-dispatching module 824). Content-processing system 818 can also include instructions for applying, by the translation proxy, rules which converts the request to indicate an updated REST API version corresponding to the current version of the schema (proxy-operating module 828). Content-processing system 818 can include instructions for receiving, from the translation proxy, the converted request which indicates the updated REST API version corresponding to the current version of the schema (proxy-operating module 828 and communication module 820). Content-processing system 818 can additionally include instructions for obtaining results from the database based on the converted request and the applied rules (database managing module 830 and data-managing module 834). Content-processing system 818 can include instructions for returning the results, wherein the prior version of the REST API comprises an old version and wherein the current version of the schema comprises a new version, which enables functionality from the new version to work with the old version (communication module 820).

Content-processing system 818 can further include instructions for dispatching, by the dispatcher component, the request to an API component corresponding to the prior version of the REST API (REST-managing module 826) and for sending, by the API component corresponding to the prior version of the REST API, the request to the translation proxy (REST-managing module 826 and communication module 820). Content-processing system 818 can also include instructions for loading schema into the database or the translation proxy (schema-loading module 832).

Data 836 can include any data that is required as input or generated as output by the methods and/or processes described in this disclosure. Specifically, data 836 can store at least: a request; a REST API request; data; a version; a REST API version; a schema; a model; a data model; a database model; a database schema or model; a database schema or model version; a current version; a prior version; a nonmatching version; an indicator of whether two versions match; an indicator of whether a first version is a prior version of a current version; a REST API module; an indicator or identifier of a dispatcher component, REST API module, a proxy, a translation proxy, or a daemon; a rule; a converted request; a result of applying rules to a request; a translated or converted request; a reverse translation; a reverse translated or reverse converted request; a north-to-south translation; a south-to-north translation; a result; a converted result; an indicator of an initialization process or a firmware build process; an indicator of a connection or a communication session; an OVSDB model or schema; an OPS or OVS schema; a change in a database schema or model; a table; a column; an index; a map key; a type for a column or map key; an enumeration; a category for a column; a URI; a manifest; a manifest of a release; and an instruction.

Figure 9:
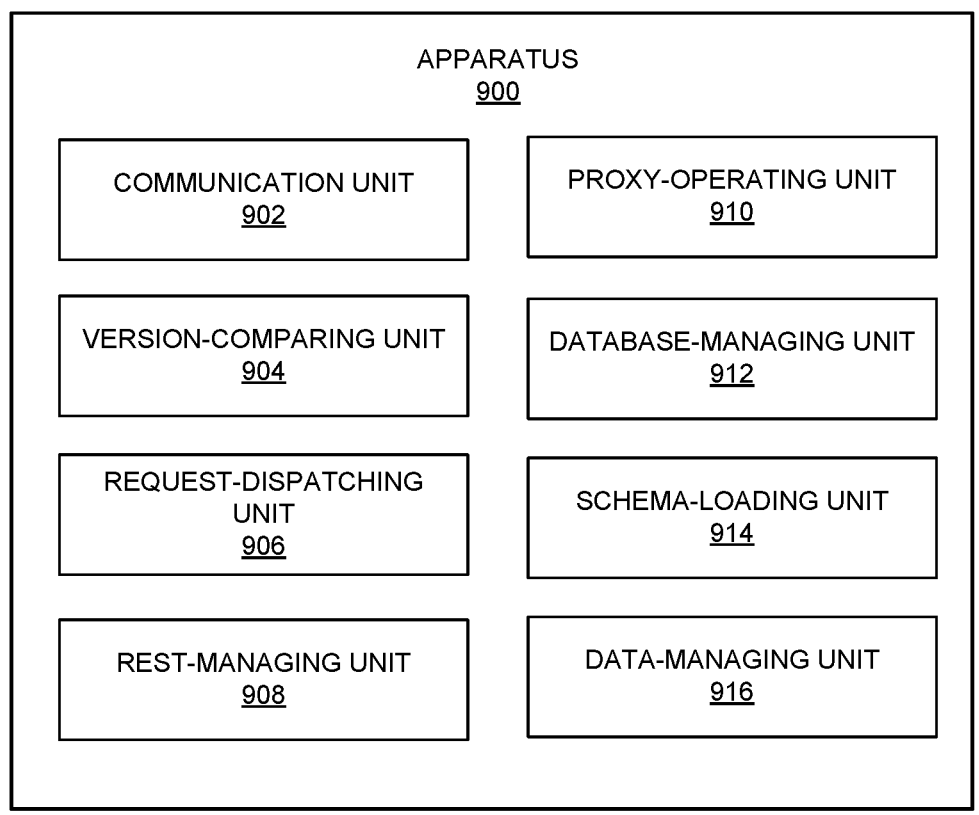
FIG. 9 illustrates an apparatus which facilitates backwards compatibility of a REST API on an evolving data model, in accordance with an aspect of the present application.

FIG. 9 illustrates an apparatus which facilitates backwards compatibility of a REST API on an evolving data model, in accordance with an aspect of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices.

Apparatus 900 may also include a non-volatile storage system or a memory management unit. Apparatus 900 can comprise modules or units 902-916 which are configured to perform functions or operations similar to modules 820-834 of computer system 800 of FIG. 8, including: a communication unit 902; a version-comparing unit 904; a request-dispatching unit 906; a REST-managing unit 908; a proxy-operating unit 910; a database-managing unit 912; a schema-loading unit 914; and a data-managing unit 916.

In general, the disclosed aspects provide a system which facilitates backwards compatibility of a REST API on an evolving data model. In one aspect, during operation, the system receives a request, via a representational state transfer (REST) application programming interface (API), for data stored in a database which uses a schema associated with a current version, wherein the request indicates a version of the REST API. Responsive to determining that the indicated version is a prior version of the REST API which does not correspond to the current version of the schema used by the database, the system performs the following operations. The system dispatches the request to a translation proxy, and applies, by the translation proxy, rules which converts the request to indicate an updated REST API version corresponding to the current version of the schema. The system receives, from the translation proxy, the converted request which indicates the updated REST API version corresponding to the current version of the schema. The system obtains results from the database based on the converted request and the applied rules. The system returns the results, wherein the prior version of the REST API comprises an old version and wherein the current version of the schema comprises a new version, which enables functionality from the new version to work with the old version.

In a variation on this aspect, responsive to determining that the indicated version of the REST API in the request corresponds to the current version of the schema used by the database, the system obtains results from the database based on the request and returns the results.

In a further variation, subsequent to obtaining the results from the database based on the converted request, the system performs, by the translation proxy based on the rules, a reverse translation on the obtained results to a format associated with the request and returns the reverse translated results as the results.

In a further variation, the system loads, into the database, the schema associated with the current version and initializes, in the database, a data model with the loaded schema. The system determines all versions supported by the translation proxy. For each respective version supported by the translation proxy, the system performs the following operations. The system loads a respective schema for a respective version into a REST module and initializes, in the REST module, a REST API for the respective loaded schema. The system connects, by the REST module, to the translation proxy and the database and loads the respective schema into the translation proxy to be cached by the translation proxy.

In a further variation, the request based on the REST API is received by a web server, which forwards the request to a dispatcher component in the REST module, and the dispatcher component identifies a version based on a uniform resource identifier indicated in the request.

In a further variation, the system dispatches the request to the translation proxy by: dispatching, by the dispatcher component, the request to an API component corresponding to the prior version of the REST API; and sending, by the API component corresponding to the prior version of the REST API, the request to the translation proxy.

In a further variation, the applied rules enable the functionality from the new version to work with the old version when changes are made to the schema for the database. The changes include at least one of: adding a new table with a column containing a 1-to-m reference to pre-existing tables; removing or renaming a table; adding new columns or map keys containing at least one of: a 1-to-m reference to pre-existing tables; an m-to-1 reference to any table; and a new column which is part of a table index; removing or renaming a column or a map key; changing a type for a column or map key; modifying an index of a table; modifying an enumeration; changing a category for a column; and any type of change which makes the new schema version incompatible with the old schema version.

In a further variation, the REST API request comprises a uniform resource identifier.

In a further variation, the database is an Open vSwitch Database.

In another variation on this aspect, the system initiates a build process for a firmware image. The system obtains manifests of one or more supported releases and obtains a schema model source for a respective supported release. The system generates an OPS schema for the respective supported release based on the obtained schema model and installs the generated OPS schema for the respective supported release in the firmware image. The system prunes the generated OPS schema to obtain an OVS schema for the respective supported release and installs the OVS schema for the respective supported release in the firmware image. The system installs instructions associated with the translation proxy and the rules in the firmware image and returns the firmware image.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
generating an Open Switch (OPS) schema for one or more supported releases based on a respective schema model for each supported release;
pruning the generated OPS schema to obtain an Open vSwitch (OVS) schema for each supported release;
installing, in a firmware image, the OVS schema for each supported release, instructions associated with a translation proxy, and rules to be applied by the translation proxy;
receiving a request, via a representational state transfer (REST) application programming interface (API), for data stored in a database which uses a schema associated with a current version, wherein the request indicates a version of the REST API; and
responsive to determining that the indicated version is a prior version of the REST API which does not correspond to the current version of the schema used by the database:
dispatching the request to the translation proxy;
applying, by the translation proxy based on the installed firmware image, the rules, wherein applying the rules converts the request to indicate an updated REST API version corresponding to the current version of the schema;
receiving, from the translation proxy, the converted request which indicates the updated REST API version corresponding to the current version of the schema;
obtaining results from the database based on the converted request and the applied rules; and
returning the results, wherein the prior version of the REST API comprises an old version and wherein the current version of the schema comprises a new version, which enables functionality from the new version to work with the old version.

2. The method of claim 1, further comprising:
responsive to determining that the indicated version of the REST API in the request corresponds to the current version of the schema used by the database:
obtaining results from the database based on the request; and
returning the results.

3. The method of claim 1, wherein subsequent to obtaining the results from the database based on the converted request, the method further comprises:
performing, by the translation proxy based on the rules, a reverse translation on the obtained results to a format associated with the request; and
returning the reverse translated results as the results.

4. The method of claim 1, further comprising:
loading, into the database, the schema associated with the current version;
initializing, in the database, a data model with the loaded schema;
determining all versions supported by the translation proxy; and
for each respective version supported by the translation proxy:
loading a respective schema for a respective version into a REST module;
initializing, in the REST module, a REST API for the respective loaded schema;
connecting, by the REST module, to the translation proxy and the database; and
loading the respective schema into the translation proxy to be cached by the translation proxy.

5. The method of claim 4,
wherein the request based on the REST API is received by a web server, which forwards the request to a dispatcher component in the REST module, and
wherein the dispatcher component identifies a version based on a uniform resource identifier indicated in the request.

6. The method of claim 5, wherein dispatching the request to the translation proxy comprises:
dispatching, by the dispatcher component, the request to an API component corresponding to the prior version of the REST API; and
sending, by the API component corresponding to the prior version of the REST API, the request to the translation proxy.

7. The method of claim 1,
wherein the applied rules enable the functionality from the new version to work with the old version when changes are made to the schema for the database, and wherein the changes include at least one of:
adding a new table with a column containing a 1-to-m reference to pre-existing tables;
removing or renaming a table;
adding new columns or map keys containing at least one of:
a 1-to-m reference to pre-existing tables;
an m-to-1 reference to any table; and
a new column which is part of a table index;
removing or renaming a column or a map key;
changing a type for a column or map key;
modifying an index of a table;
modifying an enumeration;
changing a category for a column; and
any type of change which makes the new schema version incompatible with the old schema version.

8. The method of claim 1, wherein the REST API request comprises a uniform resource identifier.

9. The method of claim 1, wherein the database is an Open vSwitch Database.

10. The method of claim 1, further comprising:
initiating a build process for the firmware image;
obtaining manifests of the one or more supported releases;
obtaining the respective schema model for each supported release;
installing the generated OPS schema for the one or more supported releases in the firmware image,
wherein the rules installed in the firmware image and to be applied by the translation proxy are to convert a subsequent request which indicates a first version associated with a first supported release to indicate a second version associated with a second supported release; and
returning the firmware image.

11. A computer system, comprising:
a processor; and
a memory coupled to the processor and storing instructions which, when executed by the processor, cause the processor to perform a method, the method comprising:
generating an Open Switch (OPS) schema for one or more supported releases based on a respective schema model for each supported release;
pruning the generated OPS schema to obtain an Open vSwitch (OVS) schema for each supported release;

installing, in a firmware image, the OVS schema for each supported release, instructions associated with a translation proxy, and rules to be applied by the translation proxy;

receiving a request, via a representational state transfer (REST) application programming interface (API), for data stored in a database which uses a schema associated with a current version, wherein the request indicates a version of the REST API; and responsive to determining that the indicated version is a prior version of the REST API which does not correspond to the current version of the schema used by the database:

dispatching the request to the translation proxy;

applying, by the translation proxy based on the installed firmware image, the rules, wherein applying the rules converts the request to indicate an updated REST API version corresponding to the current version of the schema;

receiving, from the translation proxy, the converted request which indicates the updated REST API version corresponding to the current version of the schema;

obtaining results from the database based on the converted request and the applied rules;

performing, by the translation proxy based on the rules, a reverse translation on the obtained results to a format associated with the request; and returning the results, wherein the prior version of the REST API comprises an old version and wherein the current version of the schema comprises a new version, which enables functionality from the new version to work with the old version.

12. The computer system of claim 11, wherein the method further comprises:

responsive to determining that the indicated version of the REST API in the request corresponds to the current version of the schema used by the database:

obtaining results from the database based on the request; and returning the results.

13. The computer system of claim 11, wherein the method further comprises:

responsive to determining that the indicated version does not correspond to the current version of the schema used by the database, dispatching the request to a translation proxy to be converted to indicate the updated REST API version corresponding to the current version of the schema.

14. The computer system of claim 11, wherein the method further comprises:

loading, into the database, the schema associated with the current version;

initializing, in the database, a data model with the loaded schema;

determining all versions supported by the translation proxy; and for each respective version supported by the translation proxy:

loading a respective schema for a respective version into a REST module;

initializing, in the REST module, a REST API for the respective loaded schema;

connecting, by the REST module, to the translation proxy and the database; and loading the respective schema into the translation proxy to be cached by the translation proxy.

15. The computer system of claim 14, wherein the schema loaded into the database is a pruned version of the respective schema for the respective version loaded into the REST module.

16. The computer system of claim 14, wherein the database is an Open vSwitch Database, wherein a web server receives the request based on the REST API and forwards the request to a dispatcher component in the REST module, and wherein the dispatcher component identifies a version based on a uniform resource identifier indicated in the request and dispatches the request to an API component corresponding to the prior version of the REST API, and wherein the API component sends the request to the translation proxy.

17. The computer system of claim 11, wherein the applied rules enable the functionality from the new version to work with the old version when changes are made to the schema for the database, and wherein the changes include at least one of:

adding a new table with a column containing a 1-to-m reference to pre-existing tables;

removing or renaming a table;

adding new columns or map keys containing at least one of:

a 1-to-m reference to pre-existing tables;

an m-to-1 reference to any table; and a new column which is part of a table index;

removing or renaming a column or a map key;

changing a type for a column or map key;

modifying an index of a table;

modifying an enumeration;

changing a category for a column; and any type of change which makes the new schema version incompatible with the old schema version.

18. A non-transitory computer-readable storage medium storing instructions that when executed by a computer cause the computer to perform a method, the method comprising:

initiating a build process for a firmware image;

obtaining manifests of one or more supported releases;

obtaining a schema model source for a respective supported release;

generating an Open Switch (OPS) schema for the respective supported release based on the obtained schema model;

installing the generated OPS schema for the respective supported release in the firmware image;

pruning the generated OPS schema to obtain an Open vSwitch (OVS) schema for the respective supported release;

installing the OVS schema for the respective supported release in the firmware image;

installing, in the firmware image, instructions associated with a translation proxy and rules to be applied by the translation proxy;

receiving a request, via a representational state transfer (REST) application programming interface (API), for data stored in a database which uses a schema associated with a current version, wherein the request indicates a version of the REST API; and responsive to determining that the indicated version of the REST API does not correspond to the current version of the schema used by the database:

dispatching the request to the translation proxy;

applying, by the translation proxy based on the installed firmware image, the rules, wherein applying the rules converts the request to indicate an updated REST API version corresponding to the current version of the schema;

receiving, from the translation proxy, the converted request which indicates the updated REST API version corresponding to the current version of the schema;

obtaining results from the database based on the converted request and the applied rules; and returning the results, wherein the indicated version of the REST API comprises an nonmatching version and wherein the current version of the schema comprises a new version, which enables functionality from the new version to work with the nonmatching version.

19. The storage medium of claim 18, wherein the method further comprises:

responsive to determining that the indicated version of the REST API in the request corresponds to the current version of the schema used by the database:
  obtaining results from the database based on the request; and
  returning the results.

20. The storage medium of claim 18, wherein the indicated version of the REST API in the request corresponds to at least one of:

a prior version of the REST API; and a newer version of the REST API than the current version of the schema.

\* \* \* \* \*